(12) United States Patent
Miyamoto et al.

(10) Patent No.: US 6,996,169 B2
(45) Date of Patent: Feb. 7, 2006

(54) DECISION FEEDBACK EQUALIZER

(75) Inventors: Masaru Miyamoto, Tokyo (JP); Koichi Ichimura, Saitama (JP); Atsushi Fujimoto, Chofu (JP)

(73) Assignee: Iwatsu Electric Co., Ltd., Tokyo-To (JP)

( * ) Notice: Subject to any disclaimer, the term of this patent is extended or adjusted under 35 U.S.C. 154(b) by 612 days.

(21) Appl. No.: 09/866,954

(22) Filed: May 29, 2001

(65) Prior Publication Data

US 2001/0053181 A1    Dec. 20, 2001

(30) Foreign Application Priority Data

Jun. 6, 2000    (JP)    ............................. 2000-169165

(51) Int. Cl.
  *H03H 7/30*    (2006.01)

(52) U.S. Cl. ...................... 375/233; 375/232; 375/235; 348/558; 348/726; 708/323

(58) Field of Classification Search ................ 375/233, 375/350, 232, 235, 150; 370/324, 342, 442
See application file for complete search history.

(56) References Cited

U.S. PATENT DOCUMENTS

| 5,267,265 A * | 11/1993 | Mizoguchi .................. 375/233 |
| 5,541,956 A * | 7/1996 | Ueda .......................... 375/232 |
| 6,680,971 B1 * | 1/2004 | Tazebay et al. ............. 375/235 |
| 2003/0206604 A1 * | 11/2003 | Lai |

* cited by examiner

*Primary Examiner*—Shuwang Liu
*Assistant Examiner*—Eva Zheng
(74) *Attorney, Agent, or Firm*—Myron Greenspan, Esq.; Lackenbach Siegel, LLP

(57) ABSTRACT

A decision feed back equalizer provides two feedback routines for one symbol-preceding decided data. The signal space is separated into decidable areas and uncertainty areas. Within each of decidable area the distance between any point and the signal point is small. Within each uncertainty area the distance between any point and the signal point is large. If the symbol-preceding equalized signal is in a decidable area, the piece of decided data is fed back, as it is presumed to be correct. If the symbol-preceding equalized signal exists in an uncertainty area, the piece of decided data is not fed back, as it is presumed to be in error. Here the one piece data is selected from all the predicted symbol-preceding decided data so that the instant equalized data is now in the decidable area. This piece of decided data is now fed back.

3 Claims, 4 Drawing Sheets

DECIDED AREA
UNCERTAINTY AREA

DECIDED AREA
UNCERTAINTY AREA

DECISION FEEDBACK EQUALIZER

BACKGROUND OF THE INVENTION

The present invention relates to a decision feedback equalizer for equalizing waveform distortion of a received signal affected by fading in radio wave transmission medium.

In case of occurrence of fading in radio wave transmission medium, there may appear increase of intersymbol interference effected by transmission distortion and increase of noise effected by drop of receiving electric field intensity. The equalizer is useful for suppressing intersymbol interference, but not useful for suppressing interference, such as noise generated with no relation to any transmitted radio wave. Especially, in a decision feedback equalizer, it may be occurred that interference by noise increases affect to a main signal due to transfer of error data. This transfer of error will be described hereinafter.

Although the decision feedback equalizer can suppress intersymbol interference by feeding back decided data, it has undesirable tendency such that errors increase by feeding back decision data in a case where the decision error rate is not negligible. It is now assumed that a symbol of a received signal is affected by waveform distortion and decision error appears in excess of the allowance of equalization function. In this case, decision error data are fed back through a feedback tap, and waveform equalization operation is carried out on the base of its decision error data for a next symbol. When waveform equalization operation is carried out on the base of the decision error data, decision error appears for waveform equalization operation of the next symbol in spite of non existence of noise. Since decision error is also fed back for each of further succeeding symbols, chain error reaction will be liable to appear.

As mentioned above, the decision feedback equalizer has a defect such that, since a decision error of a symbol caused by noise generated with no relation to any transmitted radio wave affects to a normal symbol not affected by noise interference because of the above mentioned feed back operation of decision data, transfer of error for causing the above mentioned chain error reaction will be liable to appear.

SUMMARY OF THE INVENTION

An object of the present invention is to provide a decision feedback equalizer capable of suppressing the above mentioned transfer of error by the use of small scale of circuitry.

To attain the above object of the present invention, the decision feedback equalizer of the present invention, for equalizing waveform distortion of a received radio wave affected by fading in any radio wave transmission medium of the received radio wave, comprising:

impulse response estimating means for estimating an impulse response of the radio wave transmission medium;

first waveform equalizing means for waveform equalizing the received wave, on the base of an intersymbol interference component corresponding to more than two symbol-delayed wave and an estimated intersymbol interference component corresponding to one symbol-delayed wave, by the use of an impulse response of the radio wave transmission medium estimated by said impulse response estimating means, thereby producing an equalized signal including an intersymbol interference component of one-symbol delayed wave, said intersymbol interference component corresponding to an estimated one symbol-delayed wave being produced by the use of an intersymbol interference component corresponding to more than two symbol-delayed wave;

second waveform equalizing means for waveform equalizing said equalized signal including an intersymbol interference component of one-symbol delayed wave, on the base of intersymbol interferences component corresponding to all the one symbol-delayed waves, by the use of the impulse response of the radio wave transmission medium estimated by said impulse response estimating means;

area decision means for predicting, by deciding an existence area of a one symbol-preceding equalized signal, whether or not decision error appears because of noise interference, for carrying out area decision operation for each of respective equalized signals of instant symbol in a case where any appearance of decision error is predicted, and for generating three signals which are an equalized signal of the instant symbol presumed to be correct in its equalized signals, said decided data of the instant symbol obtained by demodulating the equalized signal, and decided data of the one preceding symbol employed for equalizing the just equalized signal, said decided data of the instant symbol being applied to said first waveform equalizing means to produce said estimated intersymbol interference component corresponding to one symbol-delayed wave; and means for producing the intersymbol interference component corresponding to more than two symbol-delayed wave by the use of the intersymbol interference component corresponding to more than two symbol-delayed wave in order to fed back the intersymbol interference component corresponding to more than two symbol-delayed wave to said first waveform equalizing means.

The existence area comprises decidable areas determined for detecting expansion of a signal point by noise and at least one uncertainty area determined for detecting certainty of presumed one symbol-preceding decided data. Each of said decidable areas can be an area where decided data is assumed to be correct since each of distance of the decided data from a corresponding proper signal point is smaller than a threshold value $TH_1$. Each of said decidable areas can be an area where decided data is assumed to be error since each of distance of the decided data from a corresponding proper signal point is larger than a threshold value $TH_2$.

The threshold values may be determined so that the threshold value $TH_1$ is equal to the threshold value $TH_2$.

BRIEF DESCRIPTION OF THE DRAWINGS

The present invention will be described in details below with reference to accompanying drawings, in which.

DETAILED DESCRIPTION

Figure 1:
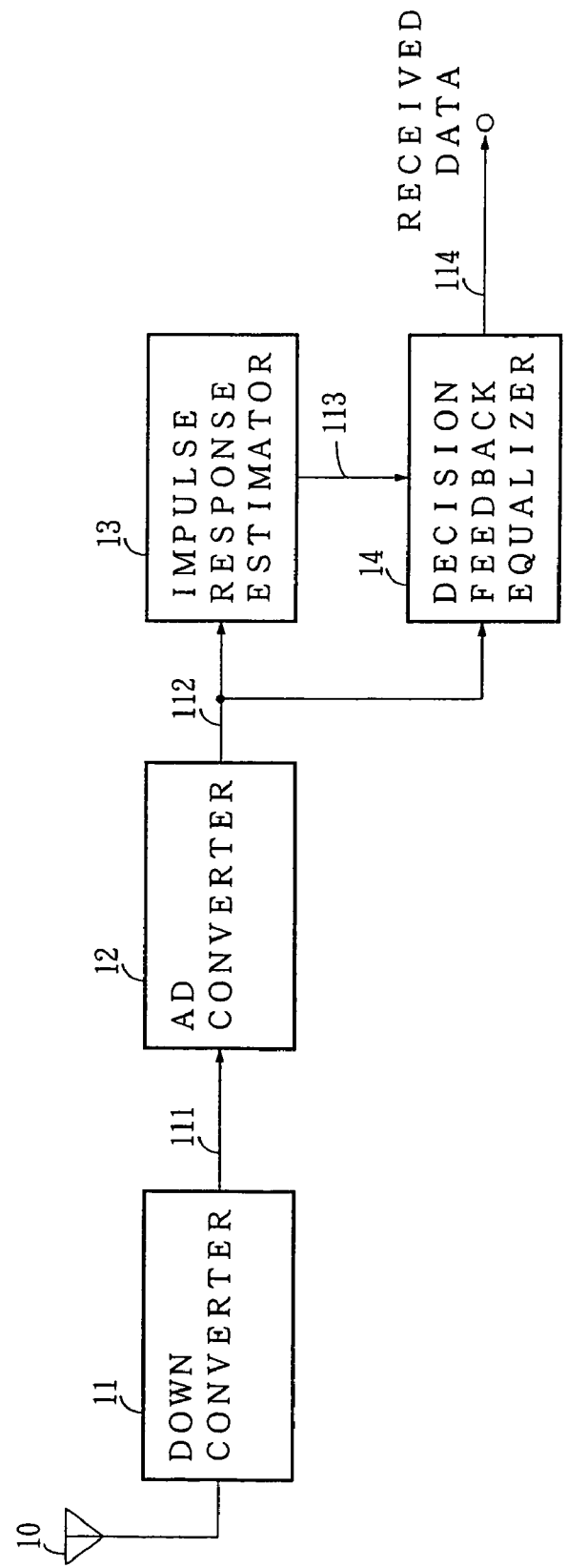
FIG. 1 is a block diagram illustrating a receiver employed in an embodiment of the present invention.

With reference to FIG. 1 illustrating a receiver employed in an embodiment of the present invention, a received analog signal of QPSK received through an antenna 10 is frequency-converted to an analog-baseband IQ signal 111 in a down converter 11 and applied to an analog-digital (AD) converter 12. The analog-baseband IQ signal 111 is converted to a digital IQ signal 112 in the AD converter 12. The digital IQ signal 112 is branched into two parts, one of which is applied to an impulse response estimator 13, and the other of which is applied to a decision feedback equalizer 14.

In the decision feedback equalizer 13, the digital IQ signal 112 is waveform-equalized and demodulated, on the base of an impulse response 113 of transmission medium, which is a transmission characteristic of the transmission medium estimated in the impulse response estimator 13, in order to produce received data 114.

Figure 2:
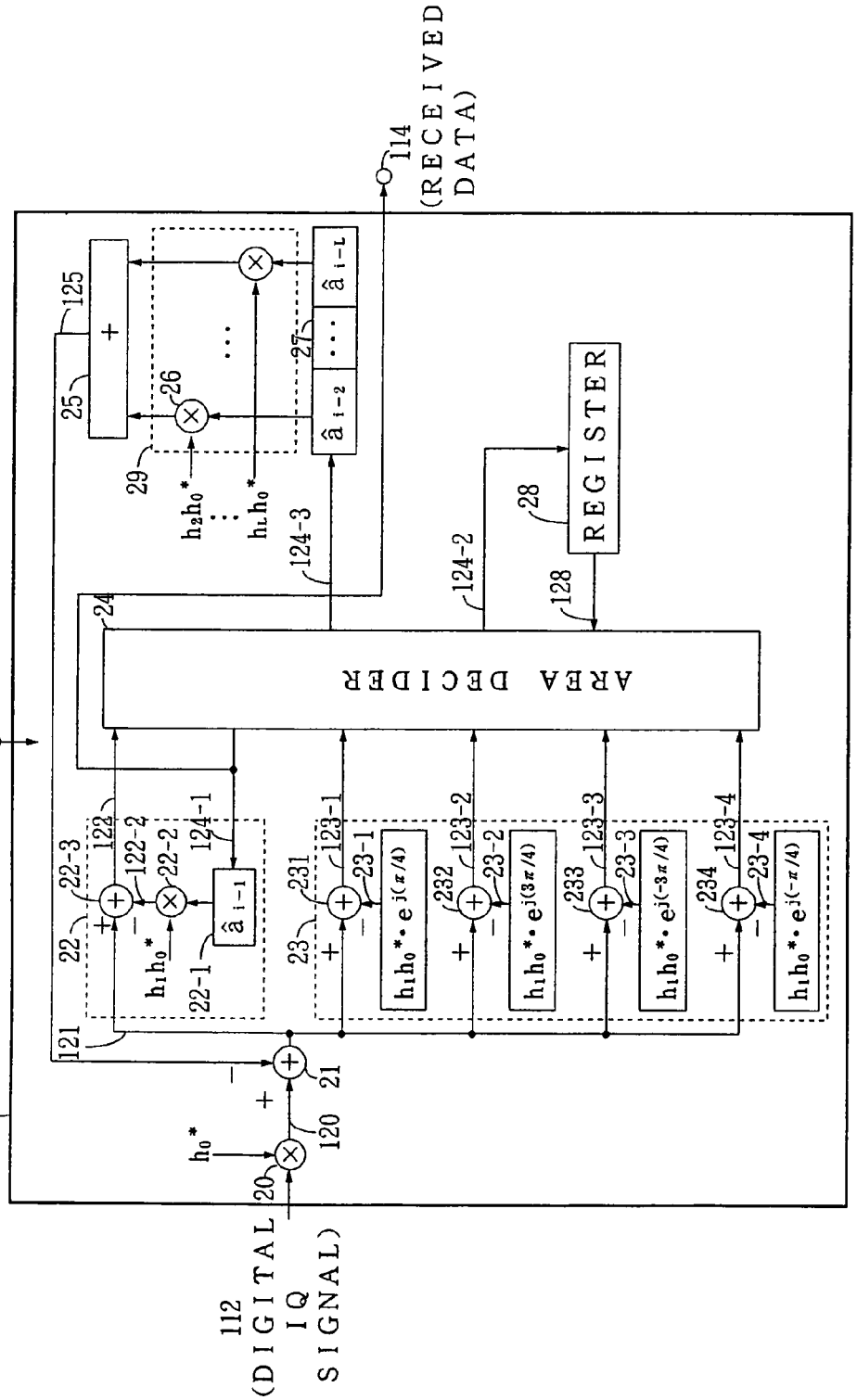
FIG. 2 is a circuit diagram illustrating an example of a decision feedback equalizer employed in the embodiment illustrated in FIG. 1.

FIG. 2 shows detailed circuitry of the decision feedback equalizer 14. In FIG. 2, an i-th digital IQ signal 112 produced from the AD converter 12 is pilot-coherent-detected by multiplying in a multiplier 20 with a conjugate number $h_0^*$ corresponding to a first received signal in the impulse response 113 of transmission medium to produce a pilot coherent detected signal 120. This pilot coherent detected signal 120 is subtracted in a subtractor 21 by an intersymbol interference replica 125 corresponding to more than two symbol-delayed wave to produce an equalized signal 121 only having an intersymbol interference replica of one symbol-delayed wave. This equalized signal 121 only having an intersymbol interference replica of one symbol-delayed wave is branched into two parts, which are respectively applied to a waveform equalizer 22, which equalizes the intersymbol interference replica of one symbol-delayed wave provided from decided data of one symbol-delayed wave, and a waveform equalizer 23, which equalizes all the predictive patterns of the decided data of one symbol-preceding wave.

In the waveform equalizer 22, an intersymbol interference 122-2 of the one symbol delayed wave is produced by weighting in a multiplier 22-2 decided data $â_{i-1}$ 22-1 of the one symbol delayed wave with a product $h_1 h_0^*$ of a component $h_1$ corresponding to the one symbol delayed wave in the impulse response 113 of transmission medium and the conjugate number $h_0^*$ corresponding to the first received signal. The equalized signal 121, only having an intersymbol interference replica of one symbol-delayed wave and applied to the waveform equalizer 22, is equalized to an equalized signal 122, from which intersymbol interference is suppressed, by subtracting in a subtractor 22-3 the intersymbol interference replica 122-2 of one symbol-delayed wave.

Accordingly, the subtractor 21 and the waveform equalizer 22 composes the first waveform equalizers for waveform equalizing the received wave, on the base of the intersymbol interference replica 125 corresponding to more than two symbol-delayed wave and an estimated intersymbol interference component corresponding to one symbol-delayed wave, by the use of an impulse response 113 of the radio wave transmission medium estimated.

In the waveform equalizer 23 corresponding to the second waveform equalizer, intersymbol interferences 23-1, 23-2, 23-3 and 23-4 of the one symbol delayed wave are produced in each of multipliers not shown by weighting all the predicted patterns:

$$(e^{j(\pi/4)}, e^{j(3\pi/4)}, e^{j(-3\pi/4)}, e^{j(-\pi/4)})$$

of the one symbol delayed wave with a product $h_1 h_0^*$ of a component $h_1$ corresponding to one symbol delayed wave in the impulse response 113 of transmission medium and the conjugate number $h_0^*$ corresponding to the first received signal. The equalized signal 121, only having an intersymbol interference replica of one symbol-delayed wave and applied to the waveform equalizer 23, is equalized to equalized signals 123-1~123-4, from which intersymbol interference is suppressed, by subtracting in respective subtractors 231, 232, 233 and 234 the intersymbol interference replicas 23-1, 23-2, 23-3 and 23-4 of all the one symbol-delayed waves predicted.

Figure 4:
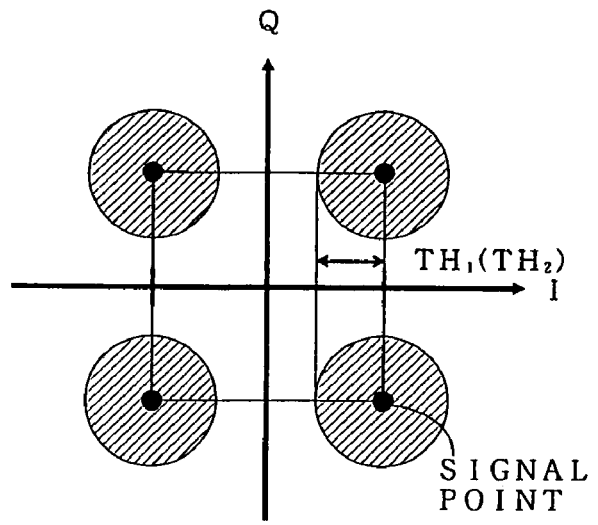
FIG. 4 is a signal area diagram explanatory of the principle of an area decider employed in the decision feedback equalizer illustrated in FIG. 2.
Figure 5:
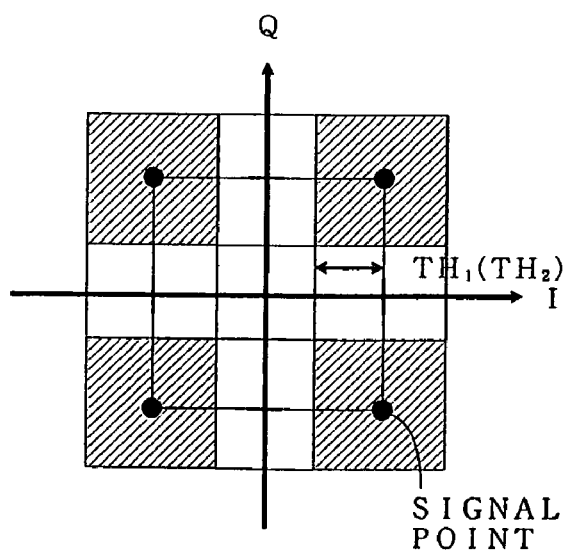
FIG. 5 is a signal area diagram explanatory of the operation of an area decider employed in the decision feedback equalizer illustrated in FIG. 2.

In an area decider 24, a signal space is separated, with reference to threshold value $TH_1$ (or $TH_2$), into two kinds of areas as shown in FIG. 4. One of the two kinds of areas is each decidable area with hatching, which is positioned near each proper signal point of dark small circle. The other of the two kinds of areas is each uncertainty area, which is positioned apart from each signal point of dark small circle. Each decidable area is to have a circle with respect to a center signal point. However, since decision operations are carried out by measuring a distance between each equalized signal and the proper signal point, the above circle area principle causes unpractical complexity of employed circuitry. To avoid these unpractical complexity of employed circuitry, each decidable area is approximated to a square shape. In a case where the decidable area is approximated to a square shape as shown in FIG. 5, the employed circuitry can be simplified since the decision operation is carried out for each I,Q component. The following operations of the area decider 24 are described in case of adoption of the decidable area of square shape.

An equalized signal is selected in accordance with later described routine from a group of equalized signals 122, 123-1~123-4 of received i-th symbol to produce an equalized signal of i-th symbol, decided data 124-1 of i-th symbol and decided data 124-3 of (i-1)-th symbol.

The decided data 124-1 of i-th symbol obtained from the area decider 24 is branched into two parts, one of which is provided for received data 114, while the other is applied to a register 22-1 to be employed as decided data of a one symbol-preceding wave at a just succeeding symbol. The decided data 124-3 of (I-1)-th symbol is applied to a shift register 27 to be stored for symbol period for decided data $â_{i-2}, \ldots$.

Decided data $â_{i-2}, \ldots$, decided data $â_{i-L}$ are weighted, at multipliers 26 in a weighting circuit 29, with products $h_2 h_0^*, \ldots, h_L h_0^*$ of components $h_2 \sim h_L$ corresponding to the two symbol delayed wave in the impulse response 113 of transmission medium and the conjugate number $h_0^*$ corresponding to the first received signal, and then combined in an adder 25 to produce the intersymbol interference replica 125 of two symbol delayed wave.

Figure 3:
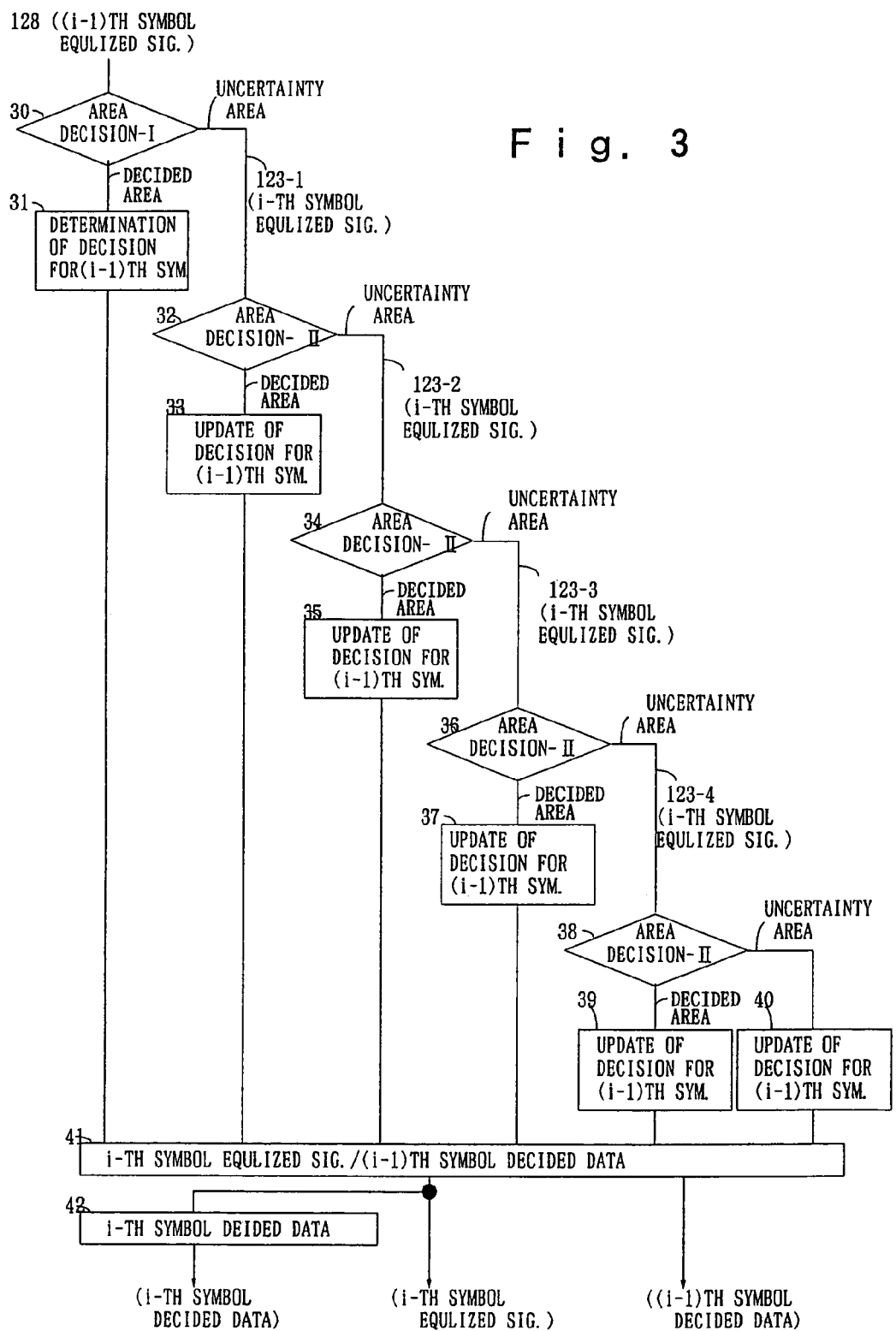
FIG. 3 is a flow-chart explanatory of the operation of an area decider employed in the decision feedback equalizer illustrated in FIG. 2.

With reference to a flow chart illustrated in FIG. 3, operations of the area decider 24 shown in FIG. 2 will now be described.

30: Area Decision I (Threshold Level $TH_1$)

In this step (30), an area decision operation is carried out for an equalized signal of (i-1)-th symbol, to decide an existence area of the (i-1)-th symbol.

31: Determination of Area Decision for (i-1)-th Symbol

This step (31) is carried out in a case where a signal point of the equalized signal of (i-1)-th symbol exists in a decidable area at the step (30). Since it is assumed that the decided data of (i-1)-th symbol is correct, this decided data of (i-1)-th symbol is determined as the decided data of (i-1)-th symbol for an equalized signal 122.

32: Area Decision II (Threshold Level $TH_2$)

This step (32) is carried out in a case where a signal point of the equalized signal of (i-1)-th symbol exists in an uncertainty area at the step (30). Since it is assumed that the decided data of (i-1)-th symbol is error, the decision operation is carried out for an i-th symbol of an equalized signal 123-1 to decide an existence area of the i-th symbol.

33: Update of Area Decision for (i-1)-th Symbol

This step (33) is carried out in a case where a signal point of the equalized signal of (i-1)-th symbol exists in a decidable area at the step (32). Since it is assumed that the decided data of (i-1)-th symbol is correct, this decided data of (i-1)-th symbol is updated and determined as the decided data of (i-1)-th symbol for an equalized signal 123-1.

34: Area Decision II (Threshold Level $TH_2$)

This step (34) is carried out in a case where a signal point of the equalized signal of (i-1)-th symbol exists in an uncertainty area at the step (32). Since it is assumed that the decided data of (i-1)-th symbol of an equalized signal 123-1 is error, the decision operation is carried out for an i-th symbol of an equalized signal 123-2 to decide an existence area of the i-th symbol.

35: Update of Area Decision for (i-1)-th Symbol

This step (35) is carried out in a case where a signal point of the equalized signal of i-th symbol exists in a decidable area at the step (34). Since it is assumed in this case that the decided data of (i-1)-th symbol is correct, this decided data of (i-1)-th symbol is updated and determined as the decided data of (i-1)-th symbol for an equalized signal 123-2.

36: Area Decision II (Threshold Level $TH_2$)

This step (36) is carried out in a case where a signal point of the equalized signal of i-th symbol exists in an uncertainty area at the step (34). Since it is assumed in this case that the decided data of (i-1)-th symbol of an equalized signal 123-2 is error, the decision operation is carried out for an i-th symbol of an equalized signal 123-3 to decide an existence area of the i-th symbol.

37: Update of Area Decision for (i-1)-th Symbol

This step (37) is carried out in a case where a signal point of the equalized signal of i-th symbol exists in a decidable area at the step (36). Since it is assumed in this case that the decided data of (i-1)-th symbol is correct, this decided data of (i-1)-th symbol is updated and determined as the decided data of (i-1)-th symbol for an equalized signal 123-3.

38: Area Decision II (Threshold Level $TH_2$)

This step (38) is carried out in a case where a signal point of the equalized signal of i-th symbol exists in an uncertainty area at the step (36). Since it is assumed in this case that the decided data of (i-1)-th symbol of an equalized signal 123-3 is error, the decision operation is carried out for an i-th symbol of an equalized signal 123-4 to decide an existence area of the i-th symbol.

39: Update of Area Decision for (i-1)-th Symbol

This step (39) is carried out in a case where a signal point of the equalized signal of i-th symbol exists at a decidable area at the step (38). Since it is assumed in this case that the decided data of (i-1)-th symbol is correct, this decided data of (i-1)-th symbol is updated and determined as the decided data of (i-1)-th symbol for an equalized signal 123-4.

40: Determination of Area Decision for (i-1)-th Symbol

This step (40) is carried out in a case where a signal point of all the equalized signals of i-th symbol obtained by assuming all the decided patterns of decided data of (i-1)-th symbol exists in an uncertainty area at all the steps (32, 34, 36 and 38). Since there is no decided data of (i-1)-th symbol assumed to be correct, the decided data of (i-1)-th symbol is determined as the decided data of (i-1)-th symbol for an equalized signal 122.

41: Equalized Signal of i-th Symbol/Decided Data of (i-1)-th Symbol

An equalized signal 124-2 obtained on the base of the determined decided data 124-3 of (i-1)-th symbol and the determined decided data 124-3 of i-th symbol is provided.

42: Decided Data of i-th Symbol

A decided data decided from the equalized signal 124-2 of i-th symbol obtained on the base of the determined decided data 124-3 of (i-1)-th symbol is provided.

The threshold values $TH_1$ and $TH_2$ employed at the area decision I and II are boundaries for separating the following conditions, which include a condition: $TH_1=TH_2$:

$TH_1$: detects expansion of a signal point by noise; and $TH_2$: detects certainty of presumed one symbol-preceding decided data.

As mentioned above with reference to FIGS. 2 and 3, the decision feed back equalizer of the present invention is so constructed that the following-described two feed back routines are provided for one symbol-preceding decided data; that correctness or error of one symbol-preceding decided data is presumed from a result of area decision for one symbol-preceding equalized signal; and that one of the two feed back routines is selected.

More particularly describing, the signal space is separated into decidable areas and uncertainty areas in the present invention. Each of decidable areas is an area where a distance between any point in the decidable area and the signal point is small. Each uncertainty areas is an area where a distance between any point in the uncertainty area and the signal point is large. In a case where the one symbol-preceding equalized signal exists in a decidable area, since a distance between any point in the decidable area and the signal point is small and the one symbol-preceding decided data is presumed to be correct, the decided data is fed back. One the other hand, in a case where the one symbol-preceding equalized signal exists in an uncertainty area, since a distance between any point in the uncertainty area and the signal point is large, the one symbol-preceding decided data are presumed to be error, the decided data are not fed back, while the one symbol-preceding decided data is so selected from all the predicted symbol-preceding decided data that the instant equalized data exists in the decidable area. The decided data selected is fed back.

As precisely mentioned above, the signal space is separated into decidable areas and uncertainty areas in the present invention. In a case where the one symbol-preceding equalized signal exists in an uncertainty area, the one symbol-preceding decided data are not fed back, while the one symbol-preceding decided data is so selected that the instant equalized data exists in a decidable area. Accordingly, transfer of error can be suppressed by the use of small scale of circuitry in accordance with the present invention.

What we claim is:

1. A decision feedback equalizer for suppressing intersymbol interference by feeding back already determined data so as to equalize the waveform distortion of a received radiowave caused by the fading in any radiowave transmission medium of the received radiowave, comprising:

impulse response estimating means for estimating an impulse response of the radiowave transmission medium;

a first waveform equalizing means for equalizing the waveform of the received wave based on an intersymbol interference component corresponding to more than two symbol-delayed wave and an estimated intersymbol interference component corresponding to one symbol-delayed wave, by using an impulse response from the radiowave transmission medium estimated by said impulse response estimating means, thereby producing an equalized signal, including an intersymbol interference component corresponding to an estimated one symbol-delayed wave, said estimated one symbol-delayed wave being produced by the use of an intersymbol interference component corresponding to more than two symbol-delayed waves;

a second waveform equalizing means for equalizing the waveform of said equalized signal including an intersymbol interference component of a one-symbol delayed wave, based on an intersymbol interferences component corresponding to all the one symbol-delayed waves, using an intersymbol interferences component corresponding to all of the symbol-delayed waves, using the impulse response of the radiowave transmission medium estimated by said impulse response estimating means;

area determination means for predicting, by determining the extent of a just-preceding symbol of an equalized signal, whether or not there is any determination error due to noise interference, said area determination means functioning to carry out area determination operations for each of said respective equalized signals of a given symbol where any appearance of error in determination is predicted, and for generating three signals that are an equalized signal of the given symbol presumed to be correct in its equalized signals, this determined data as to the given being obtained by demodulating the equalized signal, and a determined piece of data of just preceding symbol being employed for equalizing the just-equalized signal, said determined date of the given symbol being applied to said first waveform equalizing means to produce said estimated intersymbol interference component corresponding to the one-symbol delayed wave; and means for producing the intersymbol interference component corresponding to more than two symbol-delayed waves in order to feed back the intersymbol interference component corresponding to more than two symbol-delayed waves to said first waveform equalizing means.

2. A decision feedback equalizer according to claim 1, in which said extent of a just-preceding symbol of an equalized signal comprises determinable areas placed so as to detect the expansion of a signal point on account of noise and at least one area of uncertainty placed so as to detect the certainty of a presumed one symbol-preceding decided data, with each of said determinable areas being an area in which decided determinable data is assumed to be correct because each distance of the determined from a corresponding proper signal point is smaller than a threshold value $TH_1$, each of said determinable being an area in which decided data is assumed to be in error because each of the distances of each piece of determined data from a corresponding proper signal point is larger than a threshold value $TH_2$.

3. A decision feedback equalizer according to claim 2, in which said threshold values are determined so that when the threshold value $TH_1$ is equal to the threshold value $TH_2$, an expansion of a signal point because of noise is detected.

* * * * *